(12) United States Patent
Cooper (10) Patent No.: US 9,002,267 B2
(45) Date of Patent: Apr. 7, 2015

(54) NEAR FIELD COMMUNICATIONS-BASED SOFT SUBSCRIBER IDENTITY MODULE

(75) Inventor: Jonathan Matthew Cooper, Kitchener (CA)

(73) Assignee: BlackBerry Limited, Waterloo (CA)

( * ) Notice: Subject to any disclaimer, the term of this patent is extended or adjusted under 35 U.S.C. 154(b) by 157 days.

(21) Appl. No.: 13/591,863

(22) Filed: Aug. 22, 2012

(65) Prior Publication Data
US 2014/0057558 A1 Feb. 27, 2014
US 2014/0302778 A9 Oct. 9, 2014

(51) Int. Cl.
*H04B 5/00* (2006.01)
*H04B 7/00* (2006.01)
*G06K 7/00* (2006.01)

(52) U.S. Cl.
CPC ......... *G06K 7/0021* (2013.01); *H04M 2250/04* (2013.01)

(58) Field of Classification Search
CPC   H04M 1/00; H04M 2250/04; H04M 2250/14
USPC ..................... 455/41.1; 705/35, 75
See application file for complete search history.

(56) References Cited

U.S. PATENT DOCUMENTS

| | | | |
|---|---|---|---|
| 2008/0162312 A1* | 7/2008 | Sklovsky et al. | 705/35 |
| 2009/0070272 A1* | 3/2009 | Jain | 705/75 |
| 2010/0090805 A1* | 4/2010 | Libotte | 340/10.2 |
| 2010/0304670 A1* | 12/2010 | Shuo | 455/41.1 |
| 2011/0080486 A1* | 4/2011 | Yamaguchi | 348/207.1 |
| 2011/0269423 A1 | 11/2011 | Schell et al. | |
| 2011/0276802 A1* | 11/2011 | Roberts et al. | 713/171 |
| 2012/0052914 A1 | 3/2012 | Yaqub et al. | |
| 2012/0255763 A1* | 10/2012 | Baek et al. | 174/250 |
| 2013/0023207 A1* | 1/2013 | Chen et al. | 455/41.1 |

FOREIGN PATENT DOCUMENTS

EP   2114098 A1   11/2009

OTHER PUBLICATIONS

European Patent Office, Extended European Search Report dated Jan. 2, 2013, issued in European Patent Application No. 12181427.1.

* cited by examiner

*Primary Examiner* — Wesley Kim
*Assistant Examiner* — Raj Chakraborty
(74) *Attorney, Agent, or Firm* — Ridout & Maybee LLP (57) ABSTRACT

Using Near Field Communications (NFC) to provision a User Equipment (UE) with Subscriber Identity Module (SIM) data for accessing a wireless services provider's network. An NFC gesture initiates an NFC link between an NFC device and a UE containing NFC circuitry. The NFC link is used to transmit SIM data stored in a memory of the NFC device to the UE. The SIM data is received by the UE and stored in a memory of a SIM module in the UE. Thereafter, the SIM data is used to access the wireless network and obtain communication services therefrom.

19 Claims, 6 Drawing Sheets

SIM card formats

| SIM card | Standard reference | Length (mm) | Width (mm) | Thickness (mm) |
|---|---|---|---|---|
| Full-size | ISO/IEC 7810:2003, ID-1 | 85.60 | 53.98 | 0.76 |
| Mini-SIM | ISO/IEC 7810:2003, ID-000 | 25.00 | 15.00 | 0.76 |
| Micro-SIM | ETSI TS 102 221 V9.0.0, Mini-UICC | 15.00 | 12.00 | 0.76 |
| Nano-SIM | ETSI TS 102 221 V11.0.0 | 12.30 | 8.80 | 0.67 |
| Embedded-SIM | JEDEC Design Guide 4.8, SON-8 | 6.00 | 5.00 | <1.0 |

NEAR FIELD COMMUNICATIONS-BASED SOFT SUBSCRIBER IDENTITY MODULE

BACKGROUND

1. Field of the Disclosure

This application relates to the field of wireless communications systems, and more particularly to mobile wireless communications devices and related methods that allow user devices to authenticate to wireless networks (e.g., cellular networks) using access control credentials provided to the user devices using Near Field Communications (NFC).

2. Description of the Background

Cellular wireless networks provide voice and data services to "user equipments" (UEs) such as cellular telephones and computers. To access the cellular network, a UE must have access credentials, such as a private key or other security information needed to authenticate the UE to the cellular network. In the prior art, the UE is most typically provisioned with access credentials using a so-called Subscriber Identity Module (SIM) card, which is hardware that stores and provides the credentials. The SIM card is inserted into a receptacle built into the main circuit board of the UE.

SIM card support may entail a relatively large footprint on the circuit board. However, the amount of data that a SIM card typically holds may not warrant such a large footprint. Nevertheless, because the SIM card must be manually handled to insert it into or remove it from the UE, there is a limit to how much its footprint can be reduced before the ability to physically handle the card is compromised.

In addition to provisioning a UE initially, currently, the SIM card must be handled when switching UEs, such as when upgrading from an old mobile phone to a newer one, or when reprovisioning a phone to work with a different carrier. In the former case, the SIM card must be physically removed from the old UE and inserted into the new UE. This may entail additional steps and further inconvenience if the new phone uses a different SIM card format, e.g., a mini SIM versus a micro SIM, or the like. In the latter case, a first SIM card must be removed from a UE and a second SIM card inserted into the same UE, which may require that the SIM card not current in use by the UE be managed so that it is not lost or damaged.

BRIEF DESCRIPTION OF THE DRAWINGS

The accompanying drawings illustrate various aspects and exemplary embodiments of the herein disclosed devices, systems, and methods. In the drawings, like numerals represent like elements, and.

DETAILED DESCRIPTION

The figures and descriptions of the disclosure have been simplified to illustrate elements that are relevant for clear understanding of the herein disclosed apparatus, systems, and methods, while eliminating, for the purposes of clarity and brevity, other elements found in typical communications equipment, and particularly Near Field Communications, apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present disclosure, a discussion of such elements and steps is not provided herein. The disclosure herein is nevertheless directed to all variations and modifications to the disclosed elements and steps that will be known or apparent to those skilled in the art in light of this disclosure. Of note, like numbers refer to like elements throughout the disclosure.

The herein disclosed apparatus, systems and methods provide novel means for provisioning UEs with information needed for wireless network access.

In an aspect of the herein disclosed systems and methods, a method of provisioning a User Equipment (UE) with Subscriber Identity Module (SIM) data for accessing a wireless services provider's network is described, comprising initiating a Near Field Communication (NFC) link between an NFC device and the User Equipment (UE), receiving by the UE via the NFC link at least a portion of SIM data stored in a tangible data storage unit of the NFC device, and storing the received SIM data in the UE.

In another aspect of the herein disclosed systems and methods, a User Equipment (UE) is described, comprising long range communication circuitry operable to communicate with a network operated by a network services provider, NFC circuitry operable to form an NFC link, a SIM module comprising a non-transitory data storage device (SIM memory) communicatively coupled to a processor and operable to store SIM data received via the NFC circuitry, the UE comprising computer-executable instructions which, when executed by the processor, cause the UE to be authenticated to the network using the SIM data stored in the SIM module.

In yet another aspect of the herein disclosed systems and methods, a Near Field Communications (NFC) enabled card is described, comprising SIM card circuitry operable to store SIM information for transmission to a UE, and NFC circuitry operable to form an NFC link and transmit the SIM information to the UE using the link.

Figure 1:
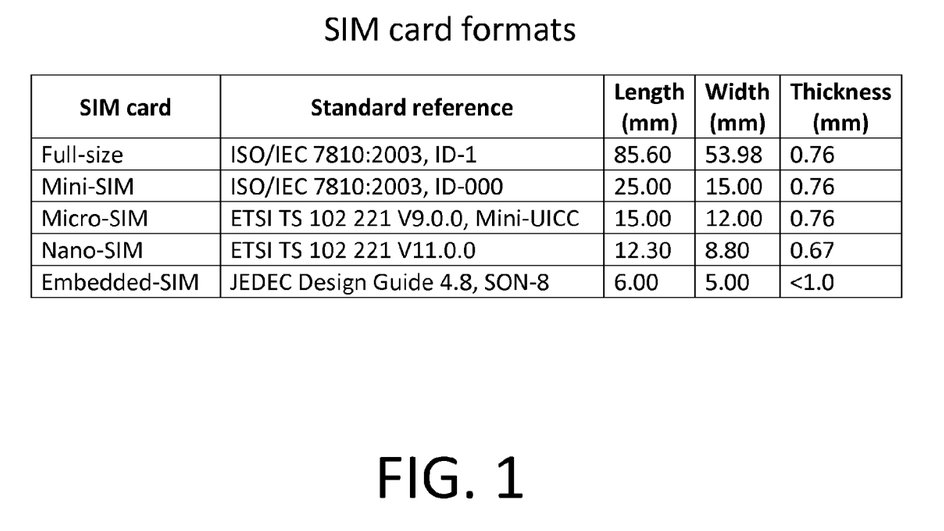
FIG. 1 lists example prior art SIM card formats.

As used herein, the terms "Subscriber Identity Module" (SIM) and "Universal Subscriber Identity Module" (USIM) each denote an application, i.e., software. A Universal Integrated Circuit Card (UICC) stores and/or runs the SIM and/or USIM application. The USIM provides, among other things, security improvements over the SIM like the mutual authentication and longer encryption keys. The term "SIM card" as used herein denotes a UICC with at least one of a SIM application and a USIM application stored thereon. The UICC typically comprises a Central Processing Unit (CPU), Read Only Memory (ROM), Random Access Memory (RAM), and Input and Output (I/O) circuits. SIM cards are available in a plurality of physical formats, including those shown in FIG. 1. The logical functions of a SIM card are independent of its format. In particular, an embedded SIM format may be available. In the prior art, the embedded SIM format may be used in machine to machine (M2M) applications, such as telemetry, industrial automation, supervisory control and data acquisition (SCADA), and emergency services.

Some mobile devices may incorporate contactless card reading technology, and/or Near Field Communication (NFC) protocols, antennas, and/or chips to enable such contactless card reading applications. NFC technology used for contactless short-range communications may be based on radio frequency identification (RFID) standards, for example. In general, NFC uses magnetic field induction enable communication between electronic devices, including mobile wireless communications devices, and to enable communications between devices and passive cards, tags, or the like. NFC communications are typically over short ranges, such as over distances of a few centimeters.

Many modern mobile telecommunications systems are cellular in nature. A cellular system is one that divides its service area into so-called cells, each with its own base station that communicates with and provides services to devices located within the cell using a communication channel arranged not to interfere with channels used in adjacent cells. Such a base station may be referred to as a NodeB, evolved NodeB, eNB, or a BS, by way of non-limiting example. Communicating devices used by end users in such a cell-based system may include stationary and mobile personal computers, laptops, netbooks, handsets, phones, etc., each of which may be referred to as a User Equipment (UE).

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. UTRA includes Wideband CDMA (WCDMA), Time Division Synchronous COMA (TD-SCDMA), and other variants of CDMA, and cdma2000 covers IS-2000. IS-95, and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, and the like. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). UMB and cdma2000 are described in documents from an organization named "3rd Generation Partnership Project 2" (3GPP2). The techniques described herein may be used for the wireless networks and radio technologies mentioned above, as well as for other wireless networks and radio technologies as will be apparent to those skilled in the pertinent arts.

Three organizations guide the development of standards conforming to the International Mobile Telecommunications (IMT) requirements (which includes so-called "Third Generation"0 (3G) systems) and the IMT-Advanced (IMT-A) requirements (which includes so-called "Fourth Generation" (4G) systems). These organizations are the 3rd Generation Partnership Project (3GPP), the 3GPP2, and the Institute of Electrical and Electronics Engineers (IEEE).

Within the 3GPP developed standards, progressively more advanced multiple access technologies have been developed. TDMA and FDMA are used in 2G standards, including the GSM, General Packet Radio Service (GPRS), and Enhanced Data rates for GSM Evolution (EDGE). CDMA is used in 3G standards, including the UMTS and its progeny High Speed Downlink Packet Access (HSDPA), High Speed Uplink Packet Access (HSUPA), High Speed Packet Access (HSPA), and enhanced HSPA (HSPA+), some of which may use W-CDMA (which uses 5 MHz bandwidth carriers). Beginning with the LTE, 3GPP promulgated standards have employed OFDM. Unlike earlier systems which initially were based on Circuit Switched (CS) technology, LTE was based from the start on Packet Switched (PS) technology.

The 3GPP supports standardization by producing highly detailed specification documents which are released in associated groups or series. For example, Release 8 (R8) describes the first version of LTE; and Release 10 (R10) describes the first version of LIE Advanced (LTE-A). Within each generation, an important consideration is to introduce new technology in a manner that is backward compatible with legacy equipment of the same generation. Such backward compatibility enables network operators to continue to provide services to existing subscribers using legacy UEs, while introducing new services and features that function only with newer UEs. The 3GPP documents pertaining to released cellular system standards and ongoing standards development are available at www.3gpp.org. The 3GPP documents that are available as of the filing of the present disclosure are hereby incorporated herein by reference in their entirety as if fully set forth.

Access credentials are generally required for a UE to access the foregoing cellular systems, and may be particularly necessary for the afore-discussed backward compatibility. A cellular system operator (carrier) may distribute the cellular system access credentials in a SIM. In exemplary embodiments of the herein disclosed apparatus, systems, and methods, the cellular access data may include authentication information. The authentication information may comprise, for example, an encryption key and one or more encryption algorithms described, for example, in the 3GPP specification series TS 35, currently available at http://www.3gpp.org/ftp/Specs/html-info/35-series.htm, the most recent versions of which, as of the filing date hereof, are incorporated herein by reference in their entirety as if set forth fully herein.

NFC is currently an open platform technology standardized in ECMA-340 and ISO/IEC 18092. These standards specify the modulation schemes, coding, transfer speeds and frame format of the RF interface of NFC devices, as well as initialization schemes and conditions required for data collision-control during initialization for both passive and active NFC modes. Furthermore, the standards also define the transport protocol, including protocol activation and data-exchange methods. The air interface for NFC is standardized in ISO IEC 18092 ECMA-340, entitled Near Field Communication Interface and Protocol-1 (NFCIP-1), and ISO/IEC 21481/ECMA-352, entitled Near Field Communication Interface and Protocol-2 (NFCIP-2). NFC also incorporates a variety of other standards. In addition, the NFC Forum has defined a common data format called NFC Data Exchange Format (NDEF), which can store and transport various kinds of data, ranging from any MIME-typed object to ultra-short RTD-documents such as URLs. Further, the NFC Forum has included the Simple NDEF Exchange Protocol in the NFC specifications, which allows sending and receiving messages between two NFC-enabled devices. In general, the NFC standards are available at http://www.nfc-forum.org/specs/, and http://www.ecma-international.org/publications/standards/. The NFC documents pertaining to released standards and ongoing standards development that are available as of the filing of the present disclosure are hereby incorporated herein by reference in their entirety as is fully set forth.

In exemplary embodiments, the SIM data may include system operator bundle information and/or user information. Examples of such information include network selection parameters, identification information, operator data, application data, etc.

Network selection parameters may include, for example, Public Land Mobile Network Selector (PLMNSel), Forbidden PLMN (FPLMN), Home PLMN (HPLMN), and the like.

Identification information may include, for example, International Mobile Subscriber Identity (IMSI), Integrated Circuit Card ID (ICCID), Temporary Mobile Subscriber Identity (TMSI), Packet TMSI (P-TMSI), Mobile Subscriber Integrated Services Digital Network Number (MSISDN), and the like.

Operator data may include, for example, Operator controlled PLMN (OPLMN) list SPN (Service Provider Name), PLMN Network Name (PNN) for name display, Emergency Control Center (ECC) for emergency calls, and other call categories, and the like.

Application data may include, for example, the SIM Application Toolkit (STK) (e.g., Roaming Broker, Enhanced Network Selection (ENS), International Mobile Equipment Identity (IMEI) change applications, etc.), and the like.

Figure 2:
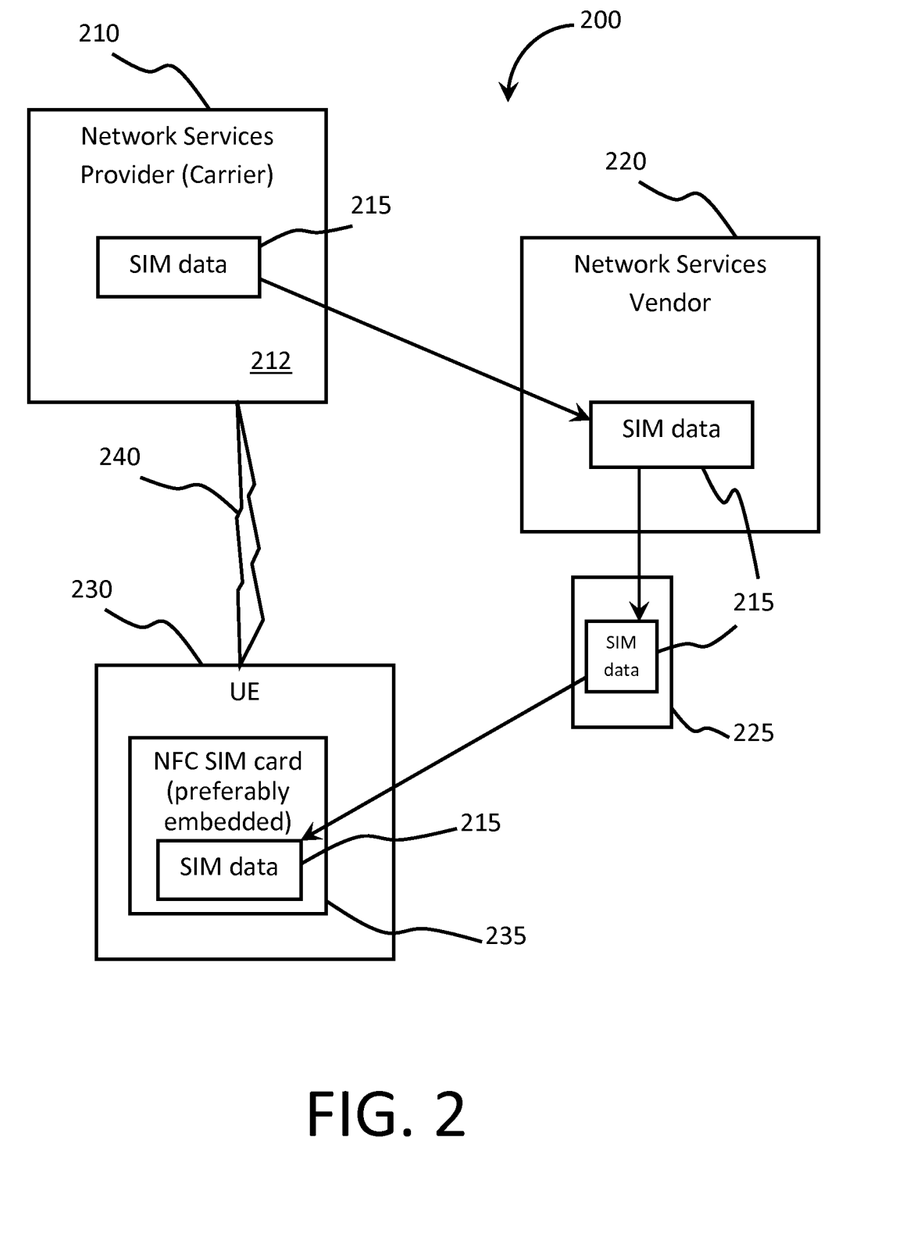
FIG. 2 is an example block diagram illustrating passing SIM information from a carrier to a vendor and thence to a UE in accordance with the herein disclosed apparatus, systems, and methods.

FIG. 2 is an exemplary block diagram of elements of wireless system 200, which system includes a network services provider (carrier) 210, a network services vendor 220, and a user equipment (UE) 230. Carrier 210 provides wireless network services to UE 230, which may be, for example, a smart phone or other cell phone, a laptop or tablet computer, or the like. Illustratively, carrier 210 may operate a cellular communications infrastructure 212 that requires authorization to access. UE 230 may be authorized to access the network using access credentials stored on the UE. The UE includes long range cellular telephone wireless communications circuitry to form, format, and communicate over, wireless link 240.

Carrier 210 may require that UE 230 authenticate to the network before services are provided. Thus, the UE must be provided, or "provisioned", with network access credentials. For example, the carrier may generate and maintain a copy of SIM data 215, and another copy of the SIM data may be provided for the use of the UE. That copy may be provided to the UE by a vendor of network services 220, for example. Commonly, a UE user will visit a retail location of vendor 220 to purchase a smartphone, tablet computer, or other UE 230, and to set up a user account with carrier 210. In an exemplary operation, the vendor may obtain from the carrier a copy of the SIM data 215, for example, preloaded onto a NFC provisioning card 225, such as a typical, credit-card sized NFC card, in accordance with the herein disclosed apparatus, systems, and methods. Reference to the NFC provisioning card, or the NFC card, hereinthroughout includes reference to any operable physical NFC card profiles with respect to the embodiments set forth herein as may be known to those skilled in the art. Of course, the user may obtain the NFC provisioning card by other means, and/or may have maintained the card 225 from a previously-provisioned device.

Additionally and alternatively, the vendor may obtain the copy of the SIM data from the carrier by other means, such as via network download, and the vendor may write the SIM data 215 onto the NFC provisioning card 225. For example, carrier 210 may distribute SIM data for multiple users to vendor 220, such as over a secure wired or wireless link, or via physical delivery of a storage device containing the SIM data.

Vendor 220 may then use NFC provisioning card 225 to provision UE 230, such as by writing the SIM data 215 from NFC card 225 onto a SIM module 235 in UE 230, using an NFC gesture. Correspondingly, a UE may "dump" SIM data to a blank NFC provisioning card, such as via NFC SIM module 235, such as in order to allow for the transfer of SIM data from a first UE to a second UE. Of course, UE 230 need not include a dedicated SIM card in order to provide the functionality of SIM module 235.

Figure 3:
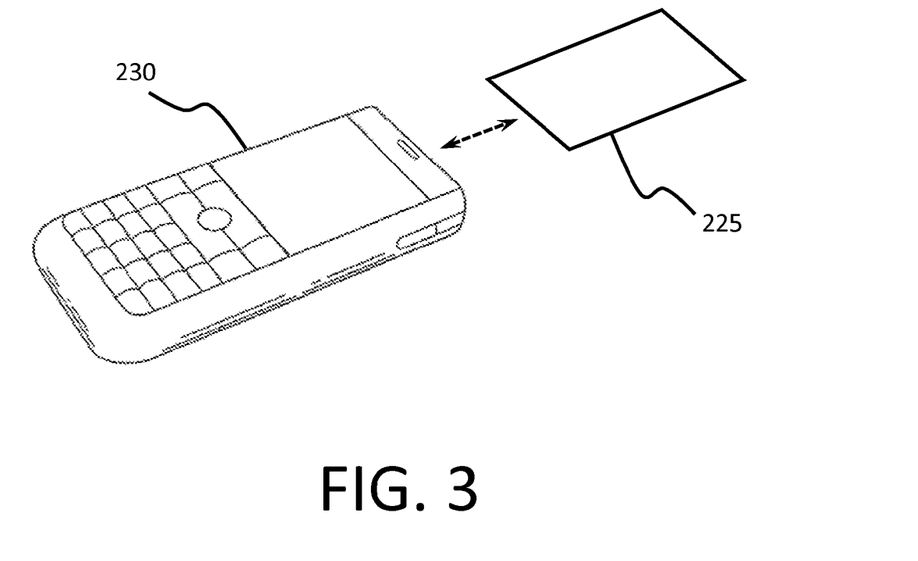
FIG. 3 illustrates an exemplary NFC gesture that sets up an NFC link between a UE and an NFC SIM card in accordance with the herein disclosed apparatus, systems, and methods.

For example, and as shown in FIG. 3, UE 230 and NFC provisioning card 225 may be brought into close proximity with each other and "tapped" together. This NFC gesture initiates and sets up the NFC link between the UE and the NFC card 225, and over this NFC link may pass the provisioning information, i.e., the SIM data 215, for UE 230, such as by passing from NFC card 225 to SIM module 235.

In an embodiment, NFC SIM module 235 may be permanently embedded in UE 230. However, SIM module 235 may also have a conventional, removable SIM form factor, such as a mini-SIM format. In such an embodiment, the NFC provisioning card containing NFC circuitry may be physically provided in a mini-SIM format, for example, and may be inserted into a conventional mini-SIM tray of UE 230 for reading by UE 230 by other than the NFC reader of UE 230. Thereby, a prior art UE intended for use with a conventional, insertable mini-SIM card, and that may not be capable of performing an NFC read, may be enabled to use NFC provisioning card 225 and the herein disclosed NFC procedures. Such a legacy UE may then benefit from the convenience of using NFC-based procedures to modify and/or transfer to another UE the SIM data stored in the inserted mini-SIM format NFC provisioning card.

In embodiments using an insertable NFC card, the card may be preloaded with SIM data in a manner similar to a prior art SIM card, and the UE may be provisioned with network access information simply by inserting the card into the UE. Alternatively, the NFC card may be blank when inserted into the UE, and the UE may be provisioned using NFC to write SIM data onto the inserted NFC card. As noted, the advantage of using an insertable NFC card rather than a prior art SIM card is that the insertable NFC SIM card enables a legacy UE that otherwise does not have NFC circuitry to obtain NFC circuitry and NFC capabilities.

After UE 230 has been provisioned with SIM data, the UE may use the stored SIM data to authenticate with the carrier 210. This authentication ultimately allows the UE to obtain wireless services, such as voice and data services from the carrier wireless system, in the manner well understood to those in the pertinent arts. More particularly, the SIM data is typically used to authenticate and identify the UE on the network, and accordingly generally includes the SIM module's integrated circuit card identifier (ICCID), its international mobile subscriber identity (IMSI), its Authentication Key (K), and an initial Local Area Identity (LAI). The SIM may also store other carrier-specific data for authenticated carrier network devices, such as an Operator-Specific Emergency Number, the SMSC (Short Message Service Center) number, Service Provider Name (SPN), Service Dialing Numbers (SON), Advice-Of-Charge parameters and Value Added Service (VAS) applications, for example.

In certain of the exemplary embodiments discussed herein, UE 230 may be provisioned with only the SIM data necessary to authenticate with the carrier 210, i.e., including the SIM module's ICCID, IMSI, $K_i$, and LAI. The UE may then gain access to the carrier network and download further SIM data, and may store this further in association with its SIM module. In either case, in an exemplary operation after the UE is provisioned, when the UE starts up it obtains the IMSI from the SIM module, and sends it to the carrier with a request for network access and authentication. The carrier finds the IMSI in its database, and locates the IMSI's associated $K_i$ in the database. The carrier then generates a Random Number (RAND) and signs it with the $K_i$, computing a number called a Signed Response 1 (SRES_1). The carrier then sends the RAND to the UE, which receives the RAND and passes it to its SIM module. The SIM module processor signs the RAND with its $K_i$, producing SRES_2, which it passes to the UE along with encryption key $K_c$. The UE send SRES_2 to the carrier, which compares its computed SRES_1 with the computed SRES_2 that the UE returned. If the two numbers match, the UE is authenticated and is granted access to the carrier network. Thereafter, $K_c$ is used to encrypt all further communications between the Mobile Equipment and the network.

Figure 4:
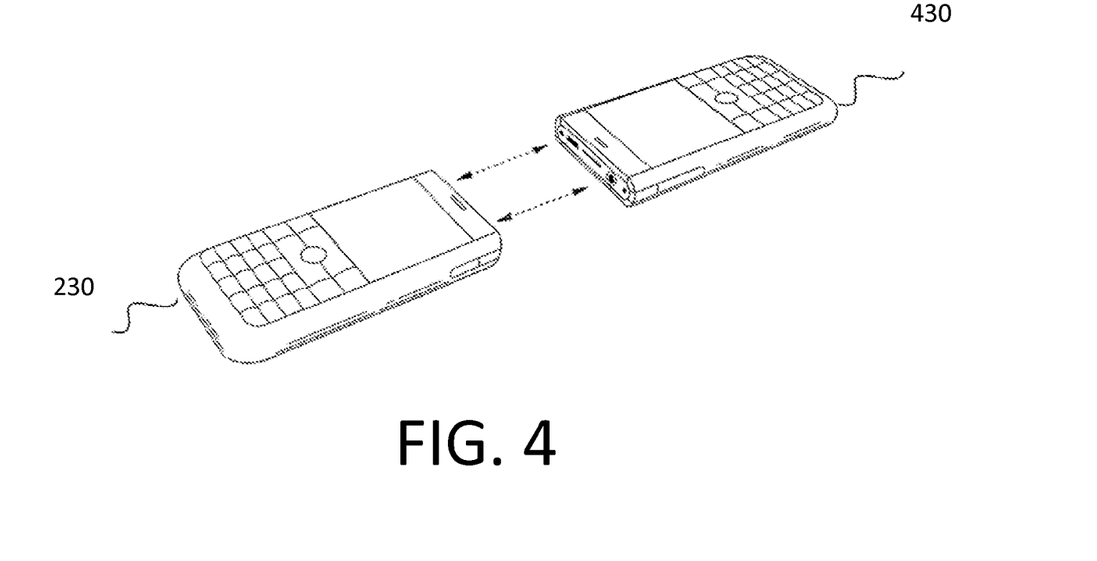
FIG. 4 illustrates an exemplary NFC gesture that sets up an NFC link between a first UE and second UE, and transfers SIM data from the first to the second UE in accordance with the herein disclosed apparatus, systems, and methods.

With reference now to FIG. 4, in an exemplary operation SIM data can be transferred from first UE 230 that initially has the SIM data, to a second UE 430 that receives the SIM data. To do so, the two UEs are brought into close proximity and tapped together to initiate and set up an NFC link between them. The SIM data is then transmitted by UE 230 and received by UE 430. UE 430 stores the SIM data in its own SIM module, and UE 230 deletes the SIM data from its SIM module.

Figure 5:
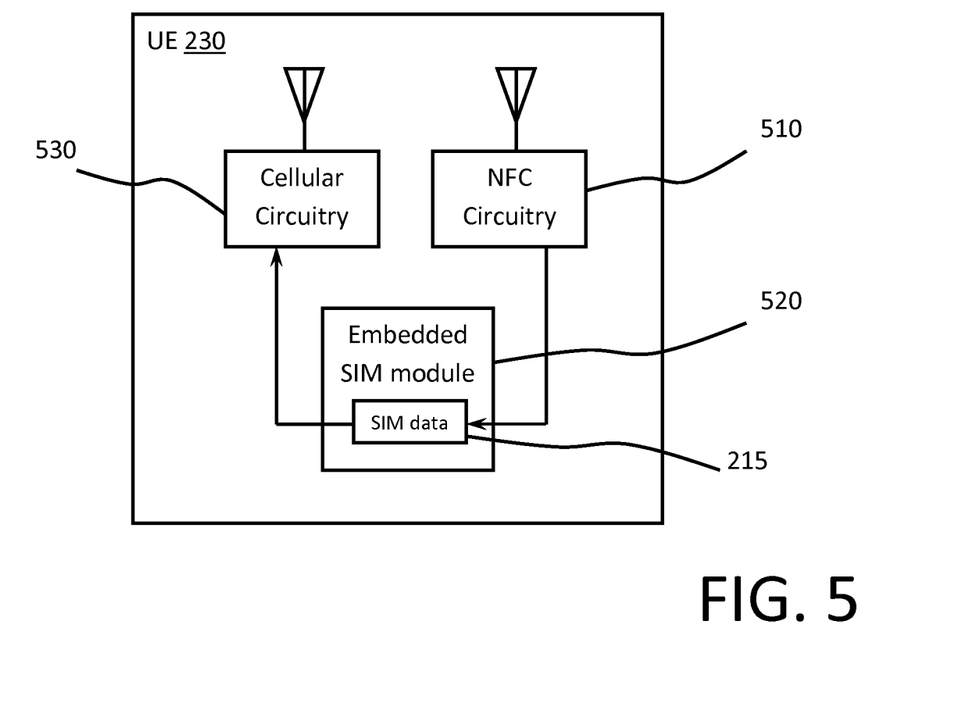
FIGS. 5 and 6 are exemplary block diagrams of an NFC enabled UE and an NFC SIM card, respectively, in accordance with the herein disclosed apparatus, systems, and methods.
Figure 6:
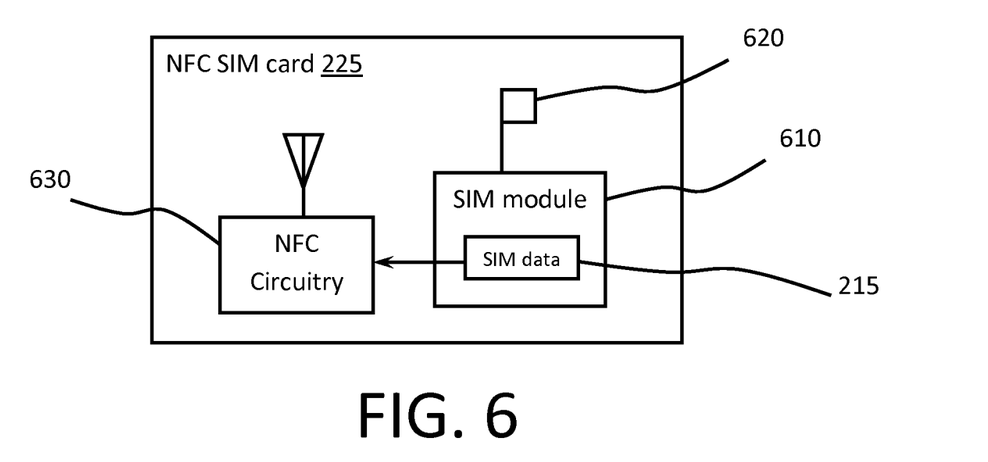

FIGS. 5 and 6 illustrate exemplary embodiments of a UE with an embedded SIM module, and a NFC provisioning card, respectively, in accordance with the herein disclosed apparatus, systems, and methods. Those skilled in the art will appreciate, in light of the foregoing discussion that, although the illustrations of FIGS. 5 and 6 relate to transfer of SIM data to a UE, a NFC provisioning card may also serve to receive SIM data from a UE, such as for transfer to a second UE. As will be understood, such a transfer from a UE may optionally render the transferring UE inoperable, such as may be indicated by the SIM module of the disabled UE responsive to an outbound SIM transfer from the disabled UE.

As shown in FIG. 5, UE 230 contains NFC circuitry 510 which can receive SIM data via an NFC link, and an embedded SIM module 520 that stores the received SIM data 215 in its memory, thereby provisioning UE 230 with the information it needs to access a long range wireless network, such as a cellular network operated by a carrier. UE 230 also contains long range communications circuitry, such as cellular circuitry 530, operable to set up a communications link with a carrier communications system. UE 230 can access cellular voice and data services by setting up a communications link with a cellular network of the carrier using the SIM data 215 stored in SIM module 520.

FIG. 6 is a block diagram of a NFC provisioning card 225 (shown illustratively as a full, credit card size NFC card) that may be used to provision an NFC-enabled UE, such as UE 230 of FIG. 5. NFC provisioning card 225 may contains a SIM module 610 with a memory that stores SIM data 215. NFC card 225 is communicatively coupled to flag 620, which may be a register, for example. NFC card 225 also has NFC circuitry 630. In an exemplary operation, an NFC gesture, such as tapping NFC card 225 with UE 230, initiates and sets up an NFC link between the NFC card and the UE. NFC card 225 uses the NFC link to send to UE 230 the SIM data 215 stored in its SIM module 610, which provisions UE 230 with the information it needs to access the carrier cellular network. NFC card 225 also sets flag 620, which is operable to prevent the NFC card 225 from provisioning another UE with the same SIM data 215.

Thereafter, in some embodiments, UE 230 may tap the NFC card 225 again to remove the SIM data from the UE 230 and notify the NFC card 225 that SIM data 215 is no longer on UE 230. The NFC card 225 may then become active with the SIM data again, and may accordingly be used to provision the same or a different UE.

Figure 7:
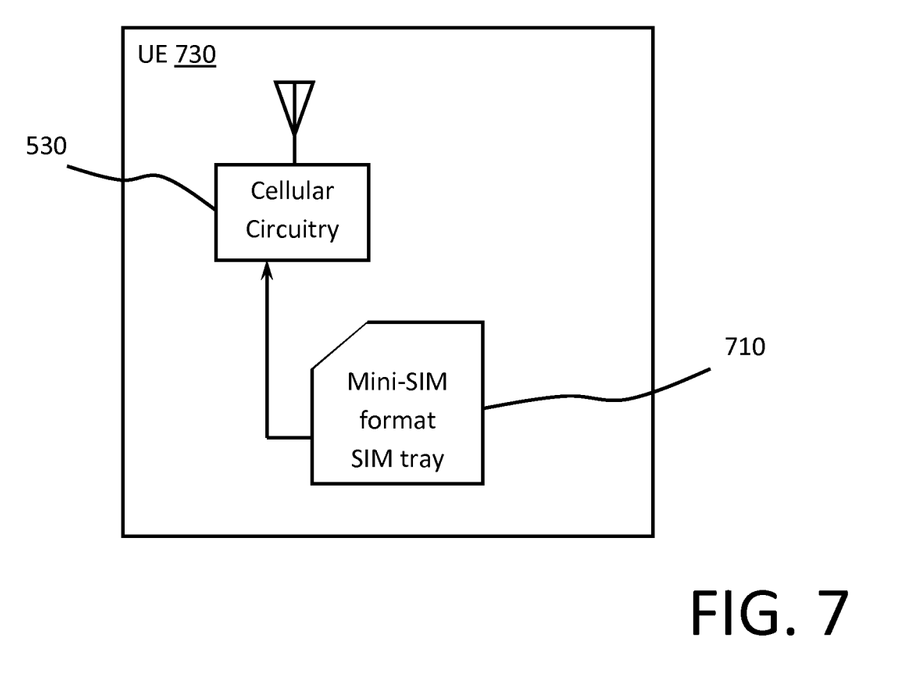
FIGS. 7 and 8 are exemplary block diagrams of a prior art UE with no NFC circuitry and having a SIM tray, and an NFC SIM card insertable in the SIM tray, respectively, in accordance with the herein disclosed apparatus, systems, and methods.
Figure 8:
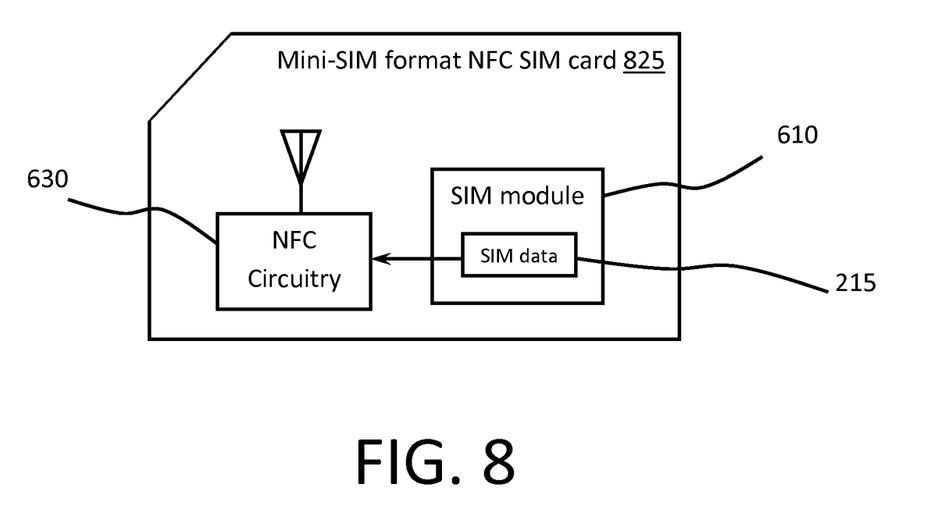

FIGS. 7 and 8 illustrate alternative exemplary embodiments of a UE with a prior art mini-SIM tray and no built-in NFC circuitry, and an insertable NFC provisioning card, respectively, in accordance with the herein disclosed apparatus, systems, and methods. The insertable NFC card may provide NFC circuitry and support for NFC operations to prior art UEs that do not have NFC circuitry built in, for example.

As shown in FIG. 7, UE 730 contains SIM tray 710 into which a standard SIM format card, such as a mini-SIM format card, may be inserted. In the prior art, such a mini-SIM format card would be a conventional SIM card with SIM data stored in its memory; and inserting the SIM card into SIM tray 710 of UE 730 would provision UE 730 with the information needed to access, for example, a cellular network operated by a carrier. UE 730 also contains long range communications circuitry, such as cellular circuitry 530, operable to set up a communications link with the carrier cellular network using SIM information stored in a card inserted into SIM tray 710. When properly provisioned, UE 730 can access cellular services, such as voice and data services, by setting up a communications link with the carrier cellular network using the SIM data stored in the inserted card. However, UE 730 does not contain any NFC circuitry. Accordingly, it cannot, without more, set up and use an NFC link.

FIG. 8 is a block diagram of a mini SIM form factor NFC provisioning card 825. The card 825 contains NFC circuitry 630, as well as SIM module 610 with a memory for storing SIM data 215. In an exemplary operation, NFC card 825 is inserted into a mini SIM format tray of a UE that does not already contain NFC circuitry, such as tray 710 of UE 730 illustrated in FIG. 7. Thereby, UE 730 is provisioned with the information it needs to access, for example, a cellular network operated by a carrier, just as in the prior art. However, in addition, UE 730 may be provided with NFC circuitry 630 whereby UE 730 can set up and communicate over an NFC link. Accordingly, UE 730 can then realize the benefits of using NFC. For example, an NFC gesture, such as tapping UE 730 with NFC capable UE 230, may thereby initiate and set up an NFC link between UE 730 and UE 230. UE 730 uses the NFC link to send to UE 230 the SIM data 215 stored in its SIM module 610, which provisions UE 230 with the information it needs to access the carrier cellular network. UE 730 may then delete the SIM data 215 from the memory of NFC card 825.

Figure 9:
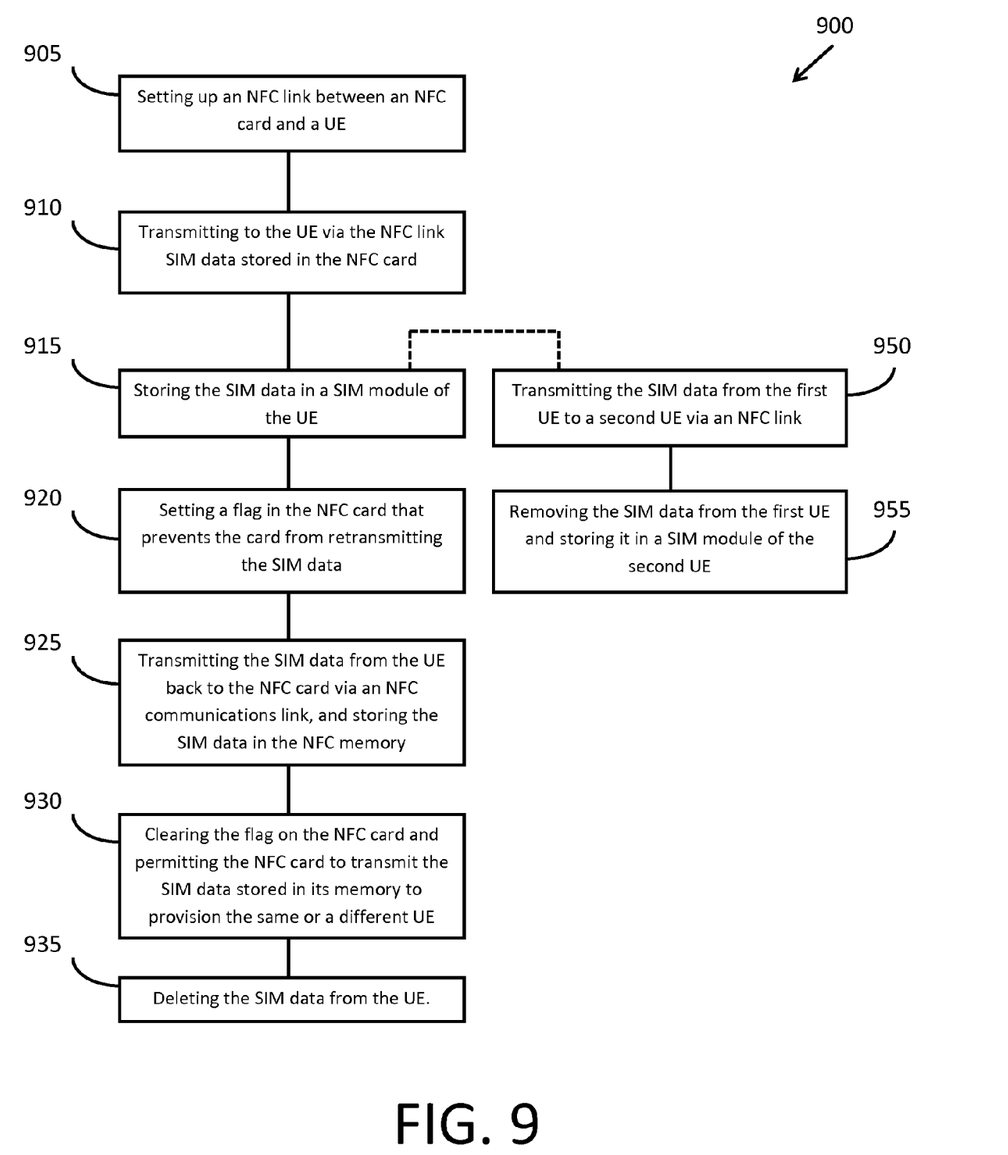
FIG. 9 is an exemplary block diagram showing a method of using NFC to provision a UE with SIM data in accordance with the disclosure.

FIG. 9 is a block diagram showing an exemplary method 900 of using NFC to provision a UE with SIM data for accessing a wireless services provider's network. As shown, the method may begin by initiating with an NFC gesture an NFC link between an NFC device, such as a NFC provisioning card, and a UE containing NFC circuitry, 905. SIM data stored in a tangible data storage unit of the NFC device (NFC memory) is transmitted via the NFC link to the UE, 910. The SIM data is then stored in a SIM module in the UE, 915. The NFC device may be a passive NFC device, and the SIM data may be generated by the wireless services provider. In an embodiment, the passive NFC device has a standard SIM card form factor, such as a full-size SIM card about 86 millimeters (mm) long and 54 mm wide, and in an embodiment, the passive NFC device has a standard credit card form factor.

After transmitting the SIM data, a flag may be set on the NFC device indicating the SIM data has been conveyed to the UE, and preventing transmitting the SIM data from the NFC device while the flag is set, 920. Thereafter, the SIM data may be transmitted from the UE back to the NFC device via an NFC communications link, and the SIM data can be stored in the NFC device memory, 925. The flag on the NFC device is cleared, thus permitting the NFC device to transmit the SIM data stored in its memory to provision the same or a different UE. The SIM data from the UE is deleted, 935.

Illustratively, after storing the SIM data in SIM module in the UE, the SIM data can be deleted from the NFC memory of the NFC device, and different SIM data can be stored in the NFC memory. The flag on the NFC device may then be cleared so that it can use the different SIM data now stored in its memory to provision a different UE (not shown).

In an optional exemplary operation indicated by the dotted path, after storing the SIM data in the SIM module of the UE, the SIM data may be sent from the UE to a second UE via an NFC communications link, 950. The SIM data may then be deleted from the first UE and stored in a SIM module of the second UE, 955. In this way, SIM information may be easily passed between UEs without the need to use a standard SIM card.

In an embodiment, the SIM module may be permanently embedded in the UE. In addition, the NFC communications links may be secure links, for example, by encrypting NFC messages using known encryption scheme.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

Further, herein are illustrated exemplary apparatuses that include functional blocks representing functions that may be implemented, for example, by an application specific processor, or software executing on a general purpose processor, or a combination thereof (e.g., firmware). The apparatuses may include a processor for executing computer code, a memory or other storage device that may store the computer code, and/or the input and/or results of the executed code, and at least one transmitter/receiver for communicating with other devices.

In related aspects, the processor, memory, and/or the transmitter/receiver may be in data communication with other components via data buses or other communication coupling. The processors may also effect initiation and scheduling of the processes and/or functions performed by the electrical components described herein.

In other related aspects, transmitter/receiver components of the apparatus described herein may be embodied in a transceiver, and/or a stand alone receiver and/or stand alone transmitter may be used in lieu of or in conjunction with a transceiver. When the apparatus is a UE, it may also include a network interface (not shown) for connecting to one or more core network entities and/or base station entities. Further, the herein described apparatus may include an additional computer readable component for storing information. That component may be operatively coupled to the other components of the disclosed apparatus via a data bus or other data communication path. Such memory components may be operable to store computer readable instructions and data for affecting the processes and behavior of the components described in each of the apparatuses, subcomponents thereof, or the processes or methods disclosed herein. The memory described herein may store instructions for executing functions associated with the components of the apparatus. It is further noted that the apparatus illustrated herein may comprise additional processors, electronic devices, hardware devices, electronic sub-components, logical circuits, memories, software codes, firmware codes, etc., or any combination thereof as needed to effect the herein described systems and methods, and/or others not described herein.

Those of skill in the art would understand that information and signals may be represented using any of a variety of different technologies and techniques. For example, data, instructions, commands, information, signals, bits, symbols, and the like that may be referenced herein may be realized using voltages, currents, electromagnetic waves, magnetic fields, electrical fields or particles, optical fields or particles, or any combination thereof.

Those of skill in the relevant arts would further appreciate that the various illustrative logical blocks, modules, circuits, and method steps described in connection with the disclosure herein may be realized using electronic hardware, computer software stored in a non-transitory data storage device and executable or executing on a processor coupled thereto, or combinations thereof. To clearly illustrate this interchangeability of such implementations, various illustrative components, blocks, modules, circuits, and steps have been described above generally in terms of their functionality. Whether such functionality is implemented as hardware alone or combined with software depends upon the particular application and design constraints imposed on the overall system. Skilled artisans may implement the described functionality in a variety of ways depending on each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunct on with a DSP core, or any other such configuration.

The steps of a method or algorithm described herein may be embodied directly in hardware, in a software module executed by a processor, or in a combination of the two. A software module may reside in RAM memory, flash memory, ROM memory, EPROM memory, EEPROM memory, registers, magnetic hard disk, a removable disk, a CD-ROM, or any other form of tangible storage medium known in the art. An exemplary storage medium is coupled to the processor such that the processor can read information from, and/or write information to, the storage medium. The storage medium may be distinct from or integral to the processor. The processor and the storage medium may reside in an ASIC. In some cases, the ASIC may reside in a user terminal. In the alternative, the processor and the storage medium may reside as discrete components in a user terminal.

In one or more exemplary designs, the functions described may be implemented using hardware alone or combined with software, firmware, or any combination thereof. If implemented using software, the software instructions may be stored on or transmitted from or to a non-transitory computer-readable medium. Computer-readable media may encompass both computer storage media and communication media including any tangible non-transitory medium that facilitates transfer of a computer program from one place to another. A storage medium may be any available non-transitory medium that can be accessed by a general purpose or special purpose computer. By way of example and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, can include any optical storage device such as compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description includes the best mode presently contemplated of carrying out the invention. The description is in no way meant to be limiting, but rather should be taken as illustrative of the general principles of the invention. The scope of the invention should be determined with reference to the claims.

What is claimed is:

1. A method of provisioning a User Equipment (UE) with Subscriber Identity Module (SIM) data for accessing a wireless services provider's network, comprising:
   initiating a Near Field Communication (NFC) link between a NFC device and the User Equipment (UE);
   receiving at the UE via the NFC link, SIM data stored in a tangible data storage unit of the NFC device;
   storing the SIM data in the UE;
   after transmitting the SIM data, setting a flag on the NFC device to thereby prevent the NFC device from retransmitting the SIM data;
   receiving a notification from the UE, via the NFC link or a subsequent NFC link between the NFC device and the UE, the notification indicating that the UE is deleting the SIM data from its memory; and
   after receiving the notification, resetting the flag to allow the NFC device to provision the same or a different UE with the SIM data.

2. The method of claim 1, wherein the NFC device is a passive NFC device and the SIM data is generated by the wireless services provider.

3. The method of claim 1, wherein the NFC device has a standard SIM card form factor.

4. The method of claim 3, wherein the standard SIM card form factor is a full-size SIM card about 86 millimeters (mm) long and 54 mm wide.

5. The method of claim 1, wherein the UE is a second UE, and the NFC device is a first UE.

6. The method of claim 5, further comprising deleting the SIM data from the first UE after transmitting the SIM data to the second UE.

7. The method of claim 1 wherein the notification further comprises transmission of
   the SIM data from the UE back to the NFC device.

8. The method of claim 1, further comprising:
   deleting the SIM data from the NFC memory of the NFC device;
   transmitting different SIM data from the UE to the NFC memory; and
   clearing the flag on the NFC device.

9. The method of claim 1, further comprising:
   transmitting the SIM data from the UE to a second UE via an NFC communications link for storage of the SIM data in a UE memory of the second UE; and
   deleting the SIM data from the first UE.

10. The method of claim 1, wherein the SIM module is permanently embedded in the UE.

11. The method of claim 1, wherein the NFC communications link is a secure link.

12. The method of claim 1, further comprising:
    providing UE user credentials for authentication prior to receiving the SIM data to the UE.

13. The method of claim 12, wherein the user credentials comprise account information specific to the user.

14. A User Equipment (UE) comprising:
    long range communication circuitry operable to communicate with a network operated by a network services provider;
    Near Field Communication (NFC) circuitry operable to form an NFC link;
    a Subscriber Identity Module (SIM) comprising a non-transitory storage device (SIM memory) communicatively coupled to a processor and operable to store SIM data received via the NFC circuitry; and
    the UE comprising computer-executable instructions which, when executed by the processor, cause the UE to:
    form a NFC link with a NFC device;
    receive SIM data via the NFC link wherein a flag is set at the NFC device, upon transmission of the SIM data, to prevent the NFC device from retransmitting the SIM data to the UE;
    store the received SIM data in the SIM module;
    authenticate to the network using the SIM data stored in the SIM module;
    be operable to transmit a notification via the NFC link or a subsequent NFC link between the NFC device and the UE, the notification indicating that the UE is deleting the SIM data from its memory, the notification transmission triggering the NFC device to reset the flag and re-use the SIM data; and
    be operable to delete the SIM data from the SIM module, upon successful transmission of the notification.

15. The UE of claim 14, wherein the SIM module is permanently embedded in the UE.

16. The UE of claim 14, wherein the network provides cellular voice and data services to the UE.

17. A Near Field Communications (NFC) enabled card, comprising:
    Subscriber Identity Module (SIM) card circuitry operable to store SIM information for transmission to a UE;

NFC circuitry operable to form an NFC link and transmit the SIM information to the UE using the link; and a flag register, which:
when the SIM information is transmitted to the UE, a flag of the flag register is set to prevent the NFC SIM card from retransmitting the SIM data; and
when the UE indicates it is deleting the SIM data from its memory, the flag is reset to activate the NFC SIM card to provision the same or a different UE with the SIM data.

18. The NFC card of claim 17, wherein:
the SIM card circuitry includes a memory for storing the SIM data; and
the NFC circuitry includes an NFC transmitter for transmitting the SIM data to the UE.

19. The NFC card of claim 17, further comprising a Central Processing Unit (CPU) to perform the setting and the resetting of the flag of the flag register.

* * * * *